UNITED STATES PATENT OFFICE.

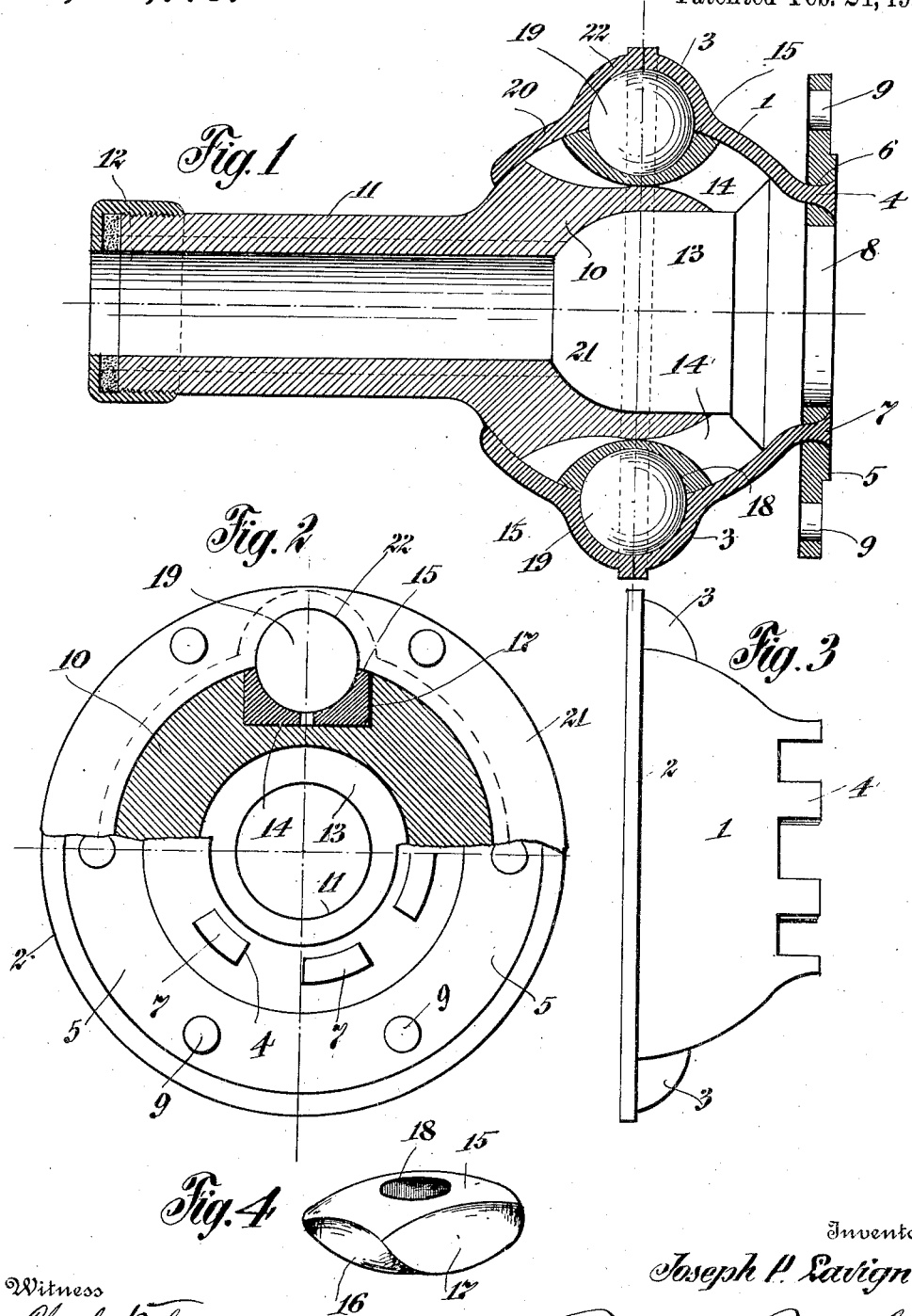

JOSEPH P. LAVIGNE, OF DETROIT, MICHIGAN, ASSIGNOR TO DETROIT MECHANICAL ENGINEERING COMPANY, OF DETROIT, MICHIGAN, A CORPORATION OF MICHIGAN.

UNIVERSAL JOINT.

1,331,775.

Specification of Letters Patent. Patented Feb. 24, 1920.

Application filed March 10, 1919. Serial No. 281,622.

*To all whom it may concern:*

Be it known that I, JOSEPH P. LAVIGNE, a citizen of the United States of America, residing at Detroit, in the county of Wayne and State of Michigan, have invented certain new and useful Improvements in Universal Joints, of which the following is a specification, reference being had therein to the accompanying drawings.

This invention relates to universal joints and more particularly to that type having an inclosed ball member, shoes and trunnion members assembled to insure rotative continuity of shafts and yet permit of a universal movement of one shaft relative to the other.

The object of my invention is to provide a universal joint of the above type which can be produced at a comparatively small cost and this is accomplished by using few parts that can be easily and quickly assembled. One feature of the joint is the use of ball or spherical bodies as trunnion members for shoes relative to a socket member, and another feature of the universal joint is the manner of attaching a cap or coupling member to a socket member.

My invention further resides in matters to be hereinafter particularly described and then claimed, and reference will now be had to the drawing, wherein Figure 1 is a longitudinal sectional view of a universal joint in accordance with my invention;

Fig. 2 is an end view of the same, partly broken away and partly in section;

Fig. 3 is a side elevation of a detached socket member, and

Fig. 4 is a perspective view of a detached shoe.

The universal joint comprises a semi-spherical socket member 1 having the large end thereof provided with a peripheral flange 2 and with diametrically opposed trunnion housings 3. The small end of the socket member terminates in circumferentially arranged lugs 4 and these lugs are adapted to hold a cap or coupling member 5 upon the small end of the socket member. The cap or coupling member 5 has slots 6 to receive the lugs 4 and said lugs are adapted to be upset or clenched, as at 7, to hold the cap or coupling member seated upon the small end of the socket member 1. Besides the cap or coupling member having a central opening 8, the marginal edges of said cap or coupling member have openings 9 to accommodate fastening means employed for connecting the cap or coupling member to a shaft coupling (not shown).

Extending into the socket member 1 is a ball member 10 having a shaft coupling sleeve 11 provided with a stuffing box 12 of conventional form. The ball member 10 has a central recess 13 and diametrically opposed walls of the ball member have grooves 14 to receive shoes 15. The shoes 15 have convex bearing faces 16 engaging the compound curved bottom walls of the grooves 14, and flat facets 17 engaging side walls of the grooves 14.

The shoes 15 also have convex upper surfaces provided with semi-spherical pockets 18 and in said pockets are placed trunnion members 19 in the form of balls or spherical bodies, as best shown in Fig. 1.

Retaining the ball member 10 in the socket member 1 and holding the shoes 15 and trunnion members 19 in place is a retaining member 20, having the large end thereof provided with a peripheral flange 21 adapted to be connected to the flange 2 of the socket member 1. Diametrically opposed walls of the retaining member 20 have housings 22 and these housings are adapted to confront the housings 3 and coöperate therewith in retaining the trunnion members 19. The small end of the retaining member 20 engages the periphery of the ball member 10 and also provides clearance for an angular movement of the shaft coupling or sleeve 11 of the ball member.

From the foregoing it will be observed that the ball member 10 may be angularly adjusted relative to the shoes 15 and that this ball member and the shoes may be angularly adjusted relative to the socket member 1 and in either instance establish rotative continuity between two shafts or parts connected by a universal joint.

The recess 13 reduces the weight of the ball member and at the same time provides clearance for a lubricant employed to insure an easy movement between the ball member, socket member, the shoes and the trunnion members therein.

I attach considerable importance to the spherical trunnion members, and with the socket member made in two sections, one of which is the retaining member 20, the shoes and trunnion members can be easily assembled.

What I claim is:—

1. A universal joint comprising a sectional socket member, a ball member therein provided with grooves, shoes in the grooves of said ball member, and spherical trunnion members in said shoes extending into said socket member.

2. A universal joint comprising a socket member provided with opposed housings, a ball member in said socket member provided with grooves, shoes in the grooves of said ball member, and spherical trunnion members in said grooves extending into the housings of said socket member.

3. A universal joint comprising a socket member provided with opposed housings, a retaining member having opposed housings confronting the housings of said socket member, a ball member in said socket member, shoes carried by said ball member, and spherical trunnions in said shoes extending into the housings of said retaining and socket members.

4. In a universal joint, a socket member provided with lugs, a cap slotted to receive the lugs of said socket member and adapted to be retained in engagement with said socket member by said lugs, a ball member in said socket member, and means between said ball member and said socket member adapted to establish rotative continuity between said members.

In testimony whereof I affix my signature in the presence of two witnesses.

JOSEPH P. LAVIGNE.

Witnesses:
 ANNA M. DORR,
 G. E. McGRANN.